United States Patent [19]

Young et al.

[11] Patent Number: 4,805,222
[45] Date of Patent: Feb. 14, 1989

[54] METHOD AND APPARATUS FOR VERIFYING AN INDIVIDUAL'S IDENTITY

[75] Inventors: James R. Young, Palo Alto; Robert W. Hammon, San Jose, both of Calif.

[73] Assignee: International Bioaccess Systems Corporation, New York, N.Y.

[21] Appl. No.: 813,262

[22] Filed: Dec. 23, 1985

[51] Int. Cl.[4] .............................................. G06K 9/00
[52] U.S. Cl. ......................................... 382/2; 382/30; 340/825.31; 340/825.34
[58] Field of Search .................. 380/2, 23; 382/2, 16, 382/30; 364/550, 569, 200, 900; 340/527, 528, 543, 825.3, 825.31, 825.32, 825.33, 825.34

[56] References Cited

U.S. PATENT DOCUMENTS

| | | | |
|---|---|---|---|
| 3,993,976 | 11/1976 | Ginsburg | 382/31 |
| 4,197,524 | 4/1980 | Salem | 340/825.31 |
| 4,455,588 | 6/1984 | Mochida et al. | 340/825.31 |
| 4,621,334 | 11/1986 | Garcia | 364/550 |

OTHER PUBLICATIONS

Gaines, R. Stockton et al., "Authentication by Keystroke Timing: Some Preliminary Results", Rand Co., R-2526-NSF, 5/80.
Umphress, David et al., "Identity Verification Through Keyboard Characteristics", *Int. J. Man–Mach. St.*, pp. 263–273, 1985.
Riganati, John P., "An Overview of Electronic ID Systems", *WESCON Tech. Papers*, 1975.
Rennick, R. J. et al., "Mufti-A Multi-Function ID System", *WESCON Tech. Papers*, 1975.
Cotton, Ira W. et al., "Approaches to Controlling Personal Access to Computer Terminals", *Proceeding Computer Networks: Treads & Appos.*, 1975.
"Guidelines on Evaluation of Techniques for Automated Personal ID", U.S. Dept. of Comm./NBS, FIPS, PUB 48, 4.1.77.
"Keystroke Dynamics Authentication of Computer Terminal Users", Bioaccess System 2000, 2000A, 2001, 2011, and OEM, 6.29.84.
Kullback, Solomon, *Information Theory & Statistics,* John Wiley & Sons Inc., pp. 3383, 1959.

*Primary Examiner*—Leo H. Boudreau
*Assistant Examiner*—Jose L. Couso
*Attorney, Agent, or Firm*—Blakely, Sokoloff, Taylor & Zafman

[57] ABSTRACT

A device and method for verifying the identity of an individual based on keystroke dynamics comprising a keyboard for the inputting of data in the form of alphanumeric characters by keystrokes, a timing encoder coupled to the keyboard for timing periods between keystrokes, a CPU coupled to RAM and to the timing encoder for generating a template for the individual, the template comprising a first plurality of features based upon a first set of time periods between keystrokes from a first set of keystrokes of the individual and the CPU determining a plurality of extracted features based upon a second set of time periods from a second set of keystrokes, and comparing the template to the plurality of extracted features such that the identity of the individual may be verified.

3 Claims, 11 Drawing Sheets

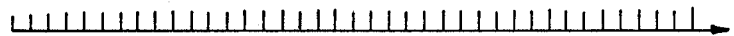
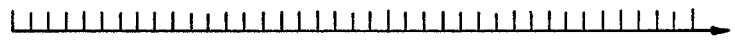
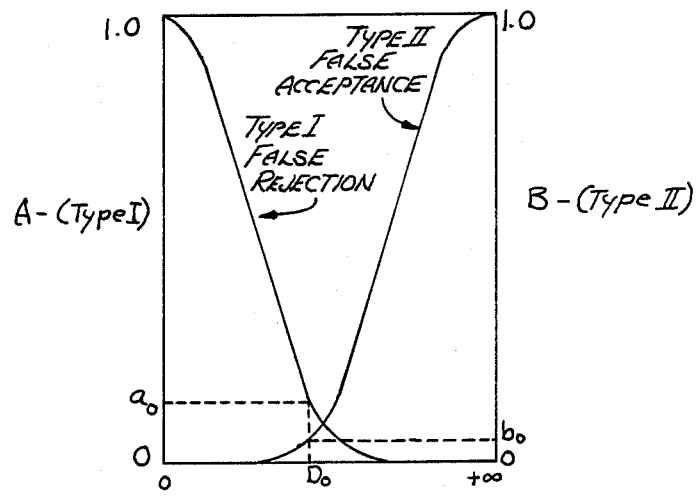

PROBABILITY DENSITY FUNCTIONS

THRESHOLD $X_0$ SELECTION

METHOD AND APPARATUS FOR VERIFYING AN INDIVIDUAL'S IDENTITY

BACKGROUND OF THE INVENTION

1. Field

The present invention relates to a system and method for verifying the identity of an individual based on the differences in the way people type. That is, the invention is based on the keystroke dynamics of individuals. The present invention has particular application in controlling access to data processing systems, such as those used in the banking industry, where typing is usually a primary means of accessing data in the computer system.

2. Art Background

There are various methods for verifying the identity of an individual described in the prior art. These methods include the use of an individual's signature, password (such as a personal identification number—PIN), palm print and/or fingerprint to verify the identify of the individual. Those methods relying on passwords are easily manipulated by obtaining the passwords. Methods relying on a peculiar physical feature (e.g. palm print) of an individual are prone to deception by presenting a photographic or xerographic image of the physical feature of the device attempting to verify an individual's identity. These methods have been suggested for use in the banking industry to control access to sites or devices such as self service banking devices and rooms containing terminals used for electronic fund transfers.

Experiments have been done to show that the way an individual types (usually a passage of text) tends to be as unique as a person's fingerprints. In one prior art embodiment, the investigators found that each of the individuals in the experiment had a distinctive typing pattern which could be used to verify the identity of the same individuals participating in the experiment. Several typists were given a paragraph of prose to type, and the times between successive keystrokes were recorded. At a later date, the same typists were given the same paragraph of prose to type; the times between successive keystrokes were again recorded. The investigators then compared the timing patterns of each individual typist and found that the patterns for a particular typist were much more similar to each other than to patterns from any other typist. In this experiment, the comparison of an individual's typing patterns to his prior typing pattern was performed well after the individual ceased his typing which developed the subsequent typing pattern. Furthermore, the investigators focused on the timing patterns in the time periods between successive keystrokes. This experiment was performed by the Rand Corporation under the sponsorship of the National Science Foundation. A report describing the experiment has been prepared by R. Stockton Gaines and others, and is entitled "Authentication by Keystroke Timing; Some Preliminary Results" and bears the identification R-2526-NSF.

As will be described, the present invention provides methods and apparatus for verifying an individual's identity based on keystroke dynamics. This verification is performed continuously and in real time. The present invention permits hierarchies of security to be defined for access to the computer system, such that more stringent verification thresholds are required for access to specified files or tasks. Lower thresholds may be defined for more routine, less critical, functions.

SUMMARY OF THE INVENTION

In general, the invention includes devices and methods for verifying an individual's identity based on his keystroke dynamics. An individual's keystroke dynamics (e.g. the way an individual types a passage of text, such as his name) tends to be as unique as a person's fingerprints. The invention compares a representation of the prior keystroke dynamics of an individual to a representation of the keystroke dynamics of a person seeking access and claiming to be that individual. The invention may be used in a computer system to assure that only authorized individuals have access to such operations as electronic funds transfers, credit evaluations, etc. Generally, when used in a computer system the operation of the invention is transparent to the user and to the application and systems software. The prior keystroke dynamics of an individual are typically maintained in the form of a template. An individual who created a template is sometimes referred to as a creator and a person seeking access (and claiming to be an authorized user having created a template) is sometimes referred to as the claimant. The invention seeks to verify that a claimant is the creator.

The invention first builds a template of an individual from an individual's typing of characters, which are usually alphanumeric characters. As the characters of the template are typed, the system of the invention times the periods (sometimes referred to as "time periods") between the keystrokes and examines other characteristics of the typing, such as the total time to type a predetermined number of characters (e.g. a character string), or the pressure applied to the various keys etc. The time periods and other characteristics are analyzed in a mathematical model to create features which make up a template. A template is typically mathematically derived from a group of features.

When a person attempts to gain access and claims to be a particular individual who is a creator, the invention compares a representation of the person's typing to a template of the creator's typing. The system usually monitors the claimant's typing by constantly comparing the claimant's typing to the creator's template. The invention, usually on a continuous basis, extracts the various features from the claimant's typing, analyzes those features and then compares the analyzed features to those same features of the template of the creator. As with the template, the features are based on the periods between keystrokes (e.g. the total time to type a predetermined character string).

Generally, the invention accomplishes the verification of an individual's identity by storing the time periods between keystrokes and comparing certain features of those collection of periods to a template which is comprised of a group of features. A keyboard means, such as a keyboard, is coupled to a keystroke timing encoder that times the periods between keystrokes. The keystroke data is transferred to a security access monitor which analyzes the timing data. The security access monitor typically stores the time periods and the number of characters in the character string currently being analyzed. The actual characters in the character string may also be stored. The security access monitor then analyzes the time periods so that a predetermined set of features is extracted from the time periods of the characters in the current character string being analyzed.

Then the security access monitor compares the features extracted from the current character string (e.g. a second set of keystrokes) to the features of the template (e.g. a first plurality of features). A comparison will give an indication of the correlation, such as differences or similarities, between the creator's keystroke dynamics and the claimant's keystroke dynamics. If the difference is beyond permissible amounts (or similarities less than permissible amounts), referred to as "thresholds", the system may respond in various ways, including denying access to the computer. The various ways that the system may respond ("response out" or "actions") are determined by a programmable security matrix that relates threshold values, creator identities and computer tasks (or files) to actions.

BRIEF DESCRIPTION OF THE DRAWINGS

The invention is illustrated in the following drawings:

FIG. 1 shows two time lines demonstrating the difference in the typing patterns between two different typists USER A and USER B; also shown in a chart indicating the time (in milliseconds) between the keystroking of successive characters from the typing of USERS A and B shown in the time lines.

FIG. 2 shows the probability curves for type 1 errors (false rejection) and type 2 errors (false acceptance).

DETAILED DESCRIPTION

Figure 3:
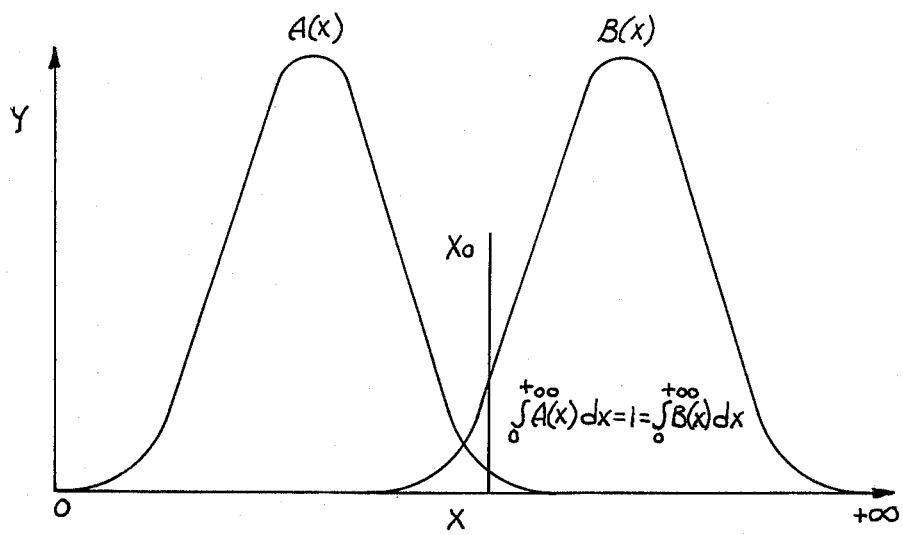
FIG. 3 shows two probability density functions A(x) and B(x).

Methods and devices for verifying the identity of an individual are disclosed. In the following description for purposes of explanation, specific characters, times, formats, features, etc. are set forth in order to provide a thorough understanding of the present invention. However, it will be apparent to one skilled in the art that the present invention may be practiced without those specific details. In other instances, well-known circuits are shown in block diagram form in order not to obscure the present invention unnecessarily.

The present invention utilizes the differences in the typing patterns between an individual A and individual B to distinguish between such individuals. In particular, the invention utilizes the time and/or pressure characteristics of a person's typing to verify that that person is presently typing. Referring to FIG. 1, the time lines shown for USER A and USER B illustrate the differences between USER A's typing and USER B's typing. For example, USER B consumes more time to type "Log in" than USER A; that is, as shown in the chart of FIG. 1, USER A typed "Log in" in 185 milliseconds, which is 65 milliseconds faster than USER B. Also note that USER B seems to wait an extra bit of time after typing the first letter of a word before typing the second letter of that word (e.g. "Log"). The differences in time (and differences in keystroking pressure) may be called keystroke dynamics and represent the different time patterns which are derived from an individual's typing. An individual's keystroke dynamics (e.g. the way an individual types a passage of text) tends to be as unique as a person's fingerprints.

Statistical analysis may be used to compare two different samples of typing patterns. For example, the data shown in the chart of FIG. 1 may be analyzed statistically to demonstrate that USER B has a different typing pattern than USER A. Thus, the average of the inter-character time of USER B's typing pattern would be larger than USER A's average inter-character time. One method of comparing typing patterns involves the use of timing certain pairs of successive keystrokes (such as "og", "in", or "lo"). If USER A were given a passage of text having several occurrences of a particular pair of successive keystrokes, the average time between a particular pair of successive keystrokes, such as "og", could be calculated for that sample. Similarly, another individual's average time for typing the same pair of successive keystrokes could be calculated from a sample of that individual's typing. The two averages derived from the samples could be compared and the difference between those averages calculated. That difference would represent a comparison of the keystroke dynamics between the individuals. That difference would also represent a "distance" between the two typing samples. Naturally, the absolute value of the distance is smaller when comparing two samples typed by the same individual against two samples typed by different individuals.

Referring to FIG. 2, two conditional probability curves labeled Type 1 and Type 2 are shown. The abscissa, labeled D, represents the absolute value of a calculated distance such as just described, between two typing samples. The ordinates represent a probability value ranging from 0 (impossible) to 1.0 (certain). In particular, the ordinate labeled A applies to the Type 1 curve and represents the probability of D being larger than $D_o$, a given value of D, given that the samples are from one individual. The ordinate labeled as B (right side of FIG. 2 graph) applies to the Type 2 curve and represents the probability of D being less than $D_o$, a given value of D, given that the samples are from different individuals. These curves are not probability density functions, but rather represent the probability value at a particular distance. It can be seen that, in general, distances calculated from two typing samples prepared by the same individual are smaller than the distances calculated from typing samples prepared by different individuals. Thus as shown in FIG. 2, for the Type 1 curve, the probability of D being larger than $D_o$, is $a_o$, given that the samples are from one individual. Similarly, for the type 2 curve, the probability of D being less than $D_o$ is $b_o$, given that the samples are from different individuals.

Rather than using a single average of the time it takes to type a particular pair of successive keystrokes, one could utilize several different elements and analyses, such as an average inter-character time, an average time to type a certain character string such as the word "the", correlation coefficients between two strings, mean and distribution of intervals over a large number of characters, etc. These various elements, usually referred to as "features", are based upon time periods which have been analyzed pursuant to a predetermined mathematical formula, such as a simple average. As described below, many features may be analyzed such that the difference between the typing samples can be reduced to a single number.

FIG. 3 illustrates two probability density functions $A(x)$ and $B(x)$. X is a measure of the difference between two typing patterns as described before. Thus, for example, X may be the difference between two averages, from two samples, representing the average time it took to type a certain pair of successive keystrokes (e.g. "og"). The density function $A(x)$ represents the probability density function of X from two typing patterns prepared by the same individual. The density function $B(x)$ is a probability density function of X values measured from two typing samples of different users. It can be seen that in general, the values of X from two different individual's typing patterns are larger than the values for X obtained by the timing patterns created by the same individual. The measure of the difference between two timing patterns obtained from two typing samples, in this particular example, is always a positive value since the absolute value of the difference is used before calculating the probability density functions. The same is true of the distances D shown in FIGS. 2, 4 and 5.

Figure 4:
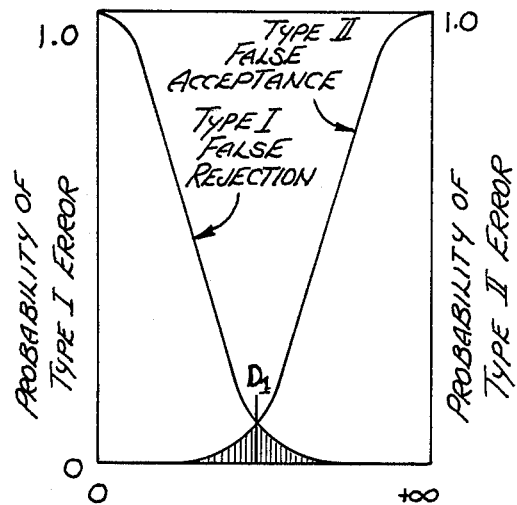
FIG. 4 shows probability curves for type 1 errors (false rejection) and type 2 errors (false acceptance).

FIG. 4 shows two curves indicating the probability values of the two types of errors which can occur in statistically attempting to verify an individual's identity. The type 1 (false rejection) error occurs when the verification method indicates that the two typing samples (such as a first set of keystrokes of an authorized user and a second set of keystrokes of an individual claiming to be that authorized user) are from different individuals when in fact they are from the same individuals. The type 2 (false acceptance) error occurs when the verification method indicates that the typing samples were created by the same individual when in fact they were created by different individuals. Referring to FIG. 4, the abscissa represents the distance expressed as a single positive number between two typing samples. The left-side ordinate, labeled as Probability of Type 1 Error, and applying to the curve labeled "Type 1 False Rejection," represents the probability of a Type 1 Error occurring at a particular value of D. Similarly, the curve labeled "Type 2 False Acceptance" shows the probability of a Type 2 False Acceptance Error occurring at a particular value of D. The right-side ordinate, labeled Probability of Type II Error, applies to the Type II curve. It should be understood that these curves shown in FIG. 4 are not probability density functions. Rather, as with FIG. 2, the Type 1 curve represents the probability of D being larger than a particular value of D selected along the abscissa when the claimant is the creator; similarly, the Type 2 curve represents the probability of D being less than a selected value of D when the claimant is an imposter.

FIG. 4 shows that as values $D_1$ increase, the probability of a Type 1 error decreases. At the same time however as $D_1$ increases, the probability of a false acceptance increases. It will be understood that the abscissa could represent the similarity between the two samples of typing rather than the difference and the curves could be similarly calculated and re-drawn.

The hatched area which is under both curves represents the measure of the efficiency of a particular way of distinguishing between typing samples. Systems having smaller intersections are more effective than systems having larger intersections. The intersection at D1, on FIG. 4, of the curves is the value of D at which equal false acceptance and false rejection errors occur.

Figure 5:
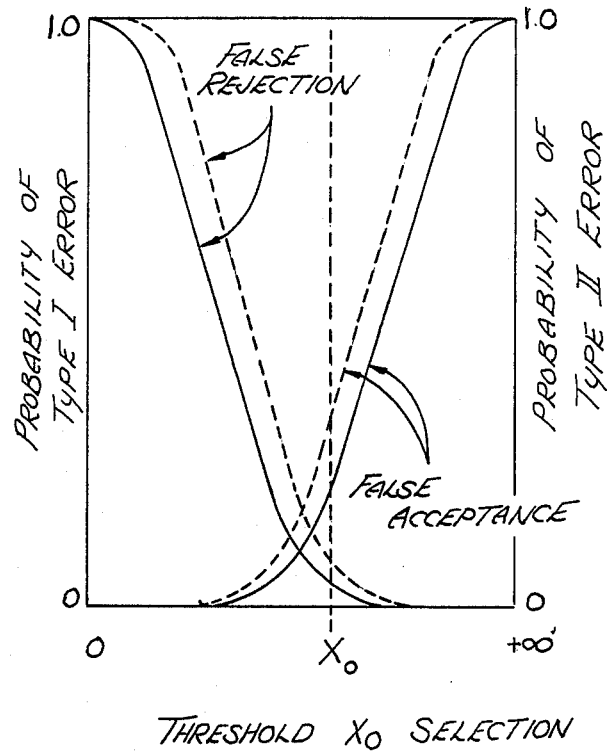
FIG. 5 shows two type 1 curves and two type 2 curves.

Referring now to FIG. 5, it can be seen that the dashed curves, representing a particular method of verifying identity by keystroke dynamics is less efficient than the system represented by the solid lines curves. FIG. 5 uses the same abscissa and ordinates (left and right) as used in FIG. 4; the curves are, as in FIG. 4, not probably density functions and represent the probability value at a particular distance. Such differences in systems arise, in general, because of the use of different features in determining the similarity or difference (in other words, the correlation) between typing samples. For example, the dashed lines shown on FIG. 5 may be obtained from a system using a simple average of the time periods between a particular pair of successive keystrokes such as "og". This system is based on the use of one feature (i.e. the simple average of the time periods between the successive keystrokes constituting "og"). The system shown by the solid curves in FIG. 5 could be generated by using several features which are reduced to a single number, such as a Euclidean Distance as described below. Thus, one may optimize the verification method (and, in particular, select features for use in the method) by preparing graphs as shown in FIGS. 4 or 5 based on empirical trials.

Various features may be used to determine whether two samples of typing are from the same individual. Typically, the first sample of typing comprises a first set of keystrokes which is then compared to a second sample being a second set of keystrokes. The features desired to be used for the comparison are normally calculated from the first set of keystrokes and then compared to the features calculated from the second set of keystrokes. The comparison will determine the correlation between the first set of keystrokes and the second set of keystrokes. As used herein to describe and claim the invention, "correlation" means either the similarity or difference between the two typing samples; that is the relationship between the two typing samples.

Some features require that they be determined from a predefined number of keystrokes. For example, the average time required to type a predefined number of keystrokes could be used as a feature. In order to make a comparison valid, that predefined number of keystrokes would be used in determining that feature for both the first and second set of keystrokes. Thus, if five keystrokes constituted the predefined number (sometimes referred to as "S") of keystrokes then a feature based on the average time to type five keystrokes would be extracted from a typing sample and used to compare to the similar feature based on the average time to type five keystrokes from a second typing sample.

A typical system may include a plurality of features. The group of features based on the first set of keystrokes is usually referred to as a template although a template may be based on one feature. A template is a model of an individual's typing pattern, usually created by an individual typing a predefined code, such as a selected passage of text. The template comprises the first plurality of features which is compared to the plurality of extracted features (also referred to as the second plurality of features) determined from the second set of keystrokes.

Features which may be included in a typical system include the time to enter common word or letter combinations (e.g. "the", "and", "for", "of", etc.), the average time between successive keystrokes, the variance of the time to enter successive keystrokes, the longest time to type a predefined number of keystrokes, the shortest time to type a predefined number of keystrokes, the average time to type a predefined number of keystrokes, the ratio between the shortest and the longest time to type a predefined number of keystrokes, etc., as well as variances or standard deviations for these values. The features used in a particular system, in order to maximize the efficiency of the system, will depend on the degree of security required and on the length and number of strings of keystrokes used to calculate certain features, such as a predefined number (S) of keystrokes.

The features may be weighted according to how useful they are in accurately distinguishing between the keystroke dynamics of different individuals. The weighting may be done by multiplying each feature by a predetermined factor. Each factor of the first plurality of features (i.e the features comprising the template) and each corresponding feature of the second plurality of features (or plurality of extracted features) is multiplied by a predetermined factor. Each feature is thereby modified so that it is weighted in the comparison between the first set of keystrokes and the second set of keystrokes. That is, the comparison between the two typing samples is based on the features as modified and hence any correlation is based on the features as modified.

Systems using different lengths of keystroke strings (e.g. a predefined number (S) of keystrokes) may have different predefined factors on the same features. For example, a system weighting a feature by a factor of 0.5, which feature is used in a system where the predefined number of keystrokes on which the feature is based, is 5 keystrokes, may have a different weight, such as 0.7, when used in a system having a string length of 10 keystrokes.

With a large population of individuals, the best features (i.e. those with the greatest discriminatory ability) will be those with a small variance measured within an individual and large variance across individuals. The features should be weighted so that the most important (i.e. "best features") are treated accordingly. For example, if features $F_1$, $F_2$, $F_3$, are the best features in the group $F_1$, $F_2$, $F_3$, $F_4$, and $F_5$, then $F_4$, and $F_5$ should be weighted less than the other features. However, generally there will be individuals who have larger than normal variance on the best features, diluting their performance. This problem can be circumvented using different weighting procedures discussed later.

When the invention is used in a system to provide security against unauthorized access to the use of the system, the invention may take into account the tasks which the claimant seeks to perform on the system, such as a computer. The invention can monitor the tasks (or files) requested, determine which tasks are requested, and, based on a predefined matrix, assign certain security levels to the various tasks. Those security levels will determine how precise the correlation between the first set of keystrokes and the second set of keystrokes must be in order for the system to verify that the claimant is in fact the creator or will determine what actions to take if the claimant is not verified (i.e. unauthorized) when performing that task. The invention can similarly relate individual claimants to different security levels, and thus determine the level of precision and actions to be taken as a function of both the claimant and the specific tasks (or files) to be used. The matrix, sometimes referred to as a programmable security matrix, may be implemented in a computer program where it can be easily adjusted for each installation of the invention, making each installation customized.

Figure 7:
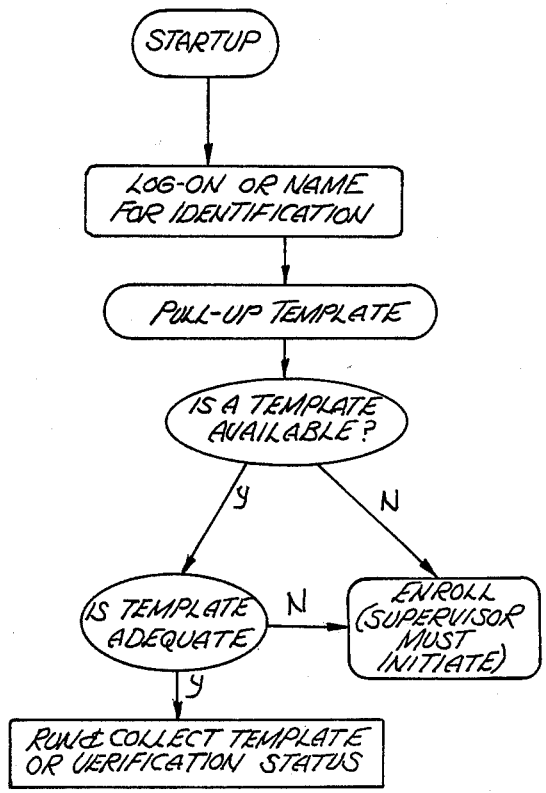
FIG. 7 is a flow chart showing a log on process of the invention as implemented on a computer system.

An individual's template is usually created under the supervision of a supervisor. Referring to FIG. 7 which broadly illustrates the startup process, the supervisor usually initiates the template creation by directing the system to allow an individual to log-on and then prepare an individual's template. Several templates may be created at this time, each based on a string of characters having different fixed lengths, such as different predefined numbers of keystrokes. The supervisor may assign certain passwords and other identifying codes to the individual at this time. These passwords and codes or simply the individual's name can be associated with the types of tasks an individual is permitted to perform on the system. The name, passwords and codes can also be associated with predefined threshold values which represent various levels of security and can also be used as data for the programmable security matrix. Thus, the types of tasks an individual will be authorized to perform can also be associated with the individual by correlating the authorized tasks to the individual's identity. The supervisor may also direct a system to require a closer match between a template and a person's typing when critical tasks are being performed. That is, the threshold for permissible differences between current typing and the template may be reduced when certain critical tasks are performed. The threshold may be varied depending on the tasks. For example, a million dollar electronic funds transfer may require a higher level of security than a status report on a credit account. Such information may be included in the programmable security matrix for customization of each installation.

The template is usually formed by a template generation means which collects timing information from an authorized individual's typing. The keystrokes used to prepare the template are referred to as the first set of keystrokes. The first set of keystrokes may be predetermined such as a predefined code of text or other alphanumeric characters or even control codes.

Figure 9:
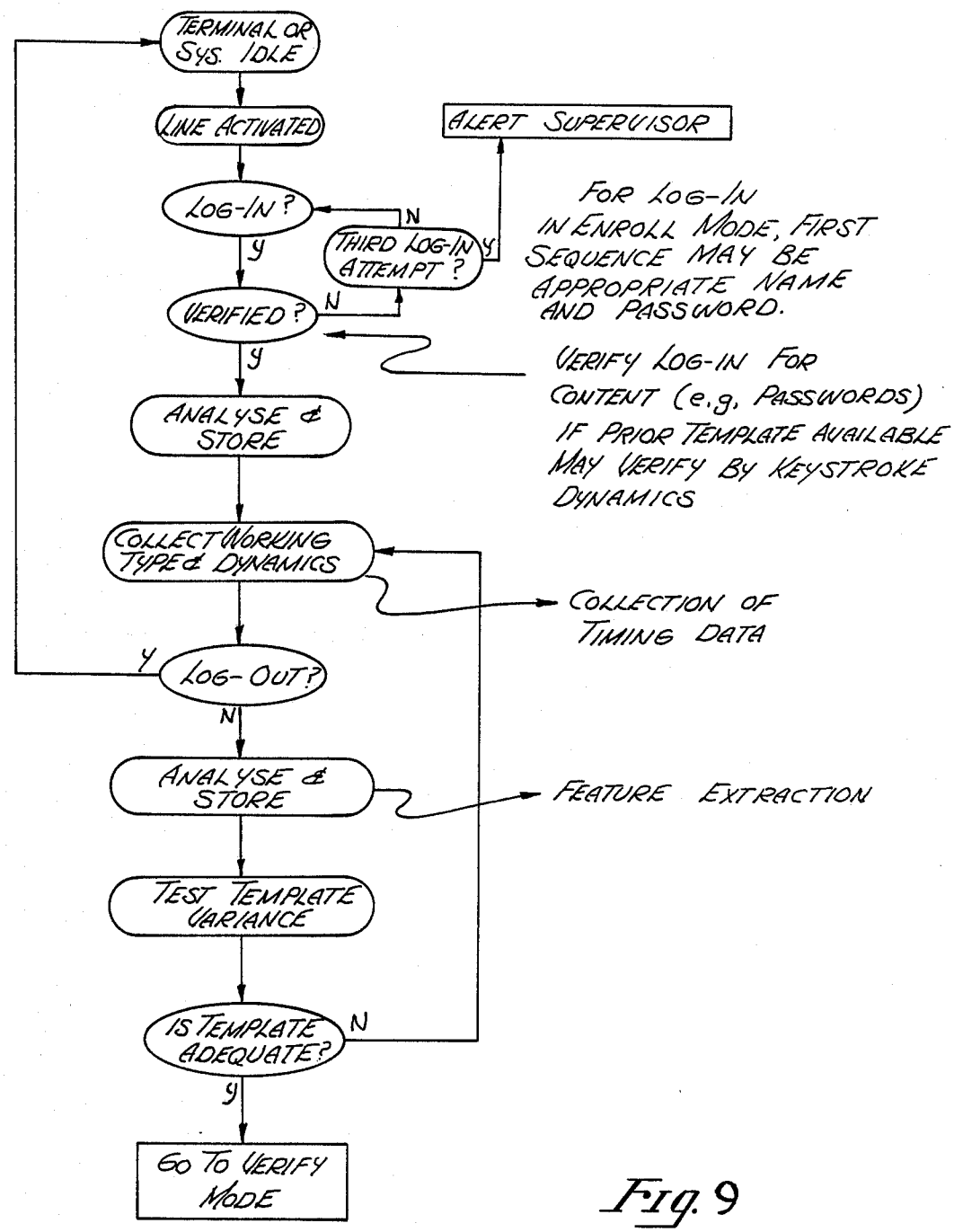
FIG. 9 is a flow chart demonstrating the enroll mode wherein a template may be built.

The creation of a template begins with an individual's logging on the system. Not every individual using the system needs to have a template. The log on codes can be used to indicate when a template must be available for a particular individual's use of the system. After logging on, the system retrieves the template if any. If no template is available but is required, then the individual will be requested to prepare a template, usually by having a supervisor initiate template creation. Similarly, if there is a template but it is not adequate because, for example the variance(s) of the features used to determine the template is (are) too large, the individual will also be requested to prepare an adequate template. Referring now to FIG. 9, which shows a general flow chart for the preparation of a template, it can be seen that a template is usually prepared after the individual logs on . Log on (or "log-in") would almost always require an individual to identify himself. The system then checks the log on codes for content determining whether those codes are authentic for the particular individual. The log on process itself may be subjected to keystroke timing in order to build a template for the log on process. After logging on, the system will collect the time periods from the first set of keystrokes. This is usually done by a template generation means (which could be a feature extraction means which analyzes both sets of keystrokes). The time periods collected from the first set of keystrokes is then analyzed to determine the various features used in the template. This analysis involves using the timing information ("time periods") to calculate mathematically the feature values. The group of features used in the template is referred to as the first plurality of features. In one implementation of the invention, the first plurality of features is based upon at least two groups of a predefined number (S) of keystrokes from the first set of keystrokes. Typically in this case, each feature from the first plurality of features is an average of the corresponding features derived from each group of (S) keystrokes from the first set of keystrokes. Thus, statistics will be available for each feature from the first plurality of features which can be used to test the adequacy of the feature and consequently the adequacy of the template. For example, the variance of the feature may be calculated to determine whether it is sufficiently stable to have an accurate value for that particular feature and for the normal variations in that feature. Each feature used in the first plurality of features could be tested for its variance and when all features have an adequately stable variance, the template would then constitute the collection of average features. The template generation means would continue to gather and analyze timing information, from each group of (S) keystrokes, to determine the features, until the variances are adequately stable. A high variance indicates inconsistency in the typing patterns of an individual, and a low variance indicates consistency. The consistency of an individual's typing patterns can be used as features as can be the average values themselves. It is the collection of average features, variances of these features, and any other analytical measure of typing patterns that represents the first and second plurality of features (and the plurality of extracted features). When an adequate template has been prepared, the system may then be used to verify that a claimant is indeed the creator (i.e. the user claiming to be an authorized individual is in fact that individual).

The creation of a template need not occur on the computer system for which access is being monitored to prevent unauthorized use. For example, the template could be created on a stand alone computer, such as a personal computer, stored and then transferred (e.g. via a modem) to a computer system using the verification system of the invention. Once created, the template may be stored in any of various types of storage means such as RAM (random access memory), ROM (read only memory) or magnetic media, magnetic tape or disks. Care must be taken to prevent tampering of the template.

Figure 6:
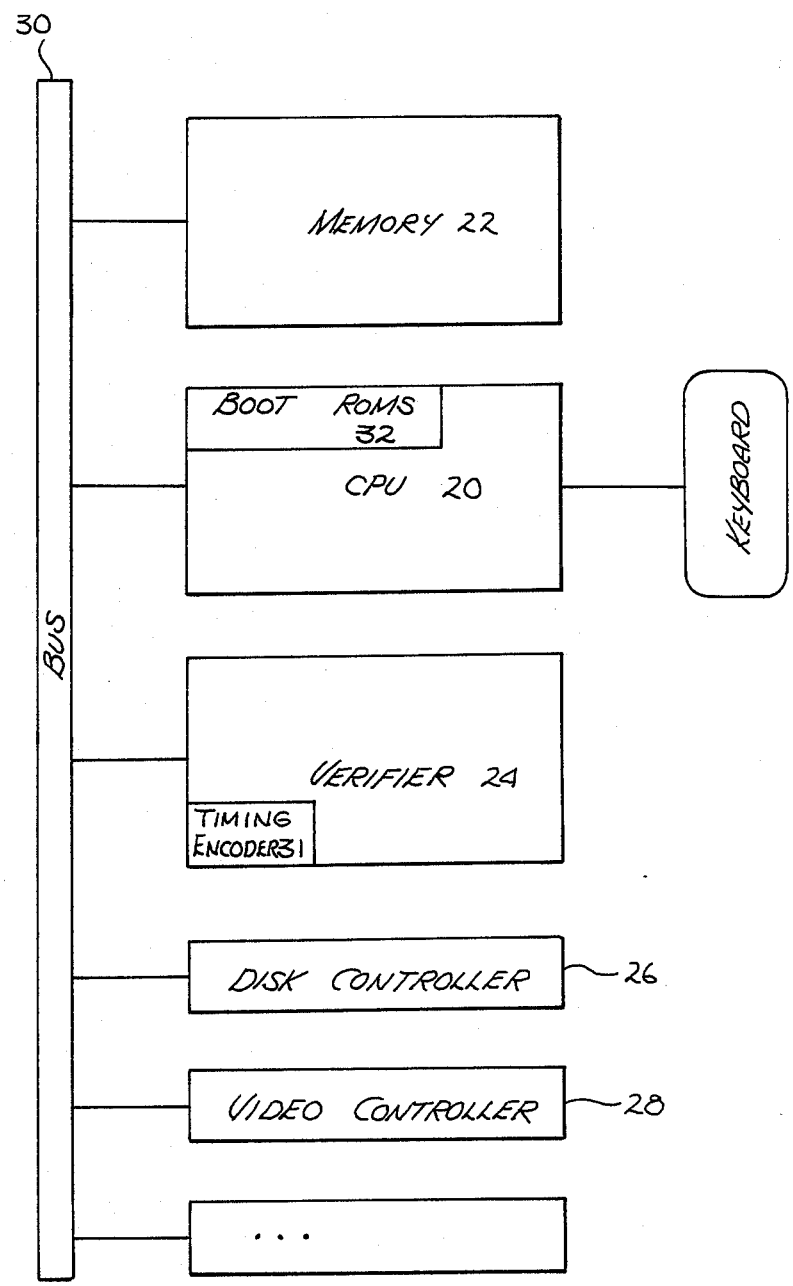
FIG. 6 shows an embodiment by block diagram of the invention as utilized in a stand alone computer, such as a personal computer.
Figure 11:
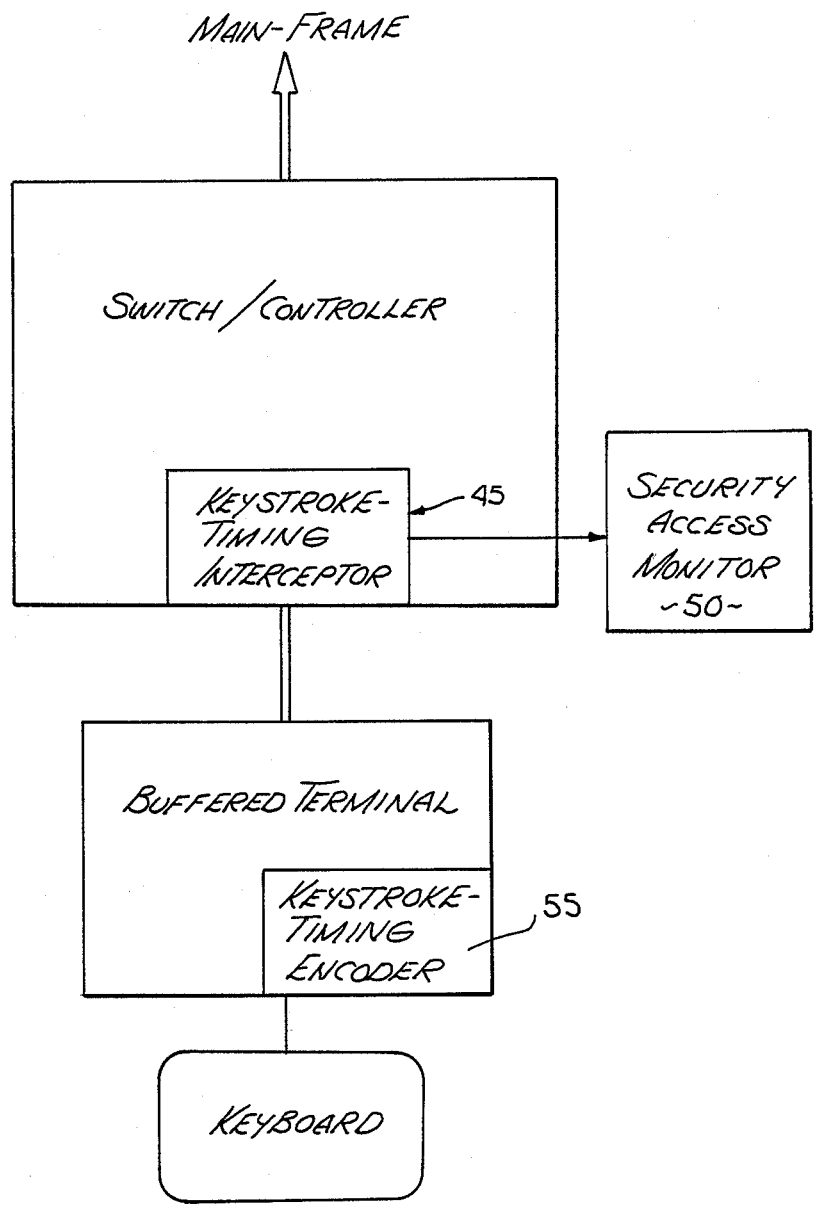
FIG. 11 is an implementation of the invention in a computer system using buffered terminals.
Figure 14:
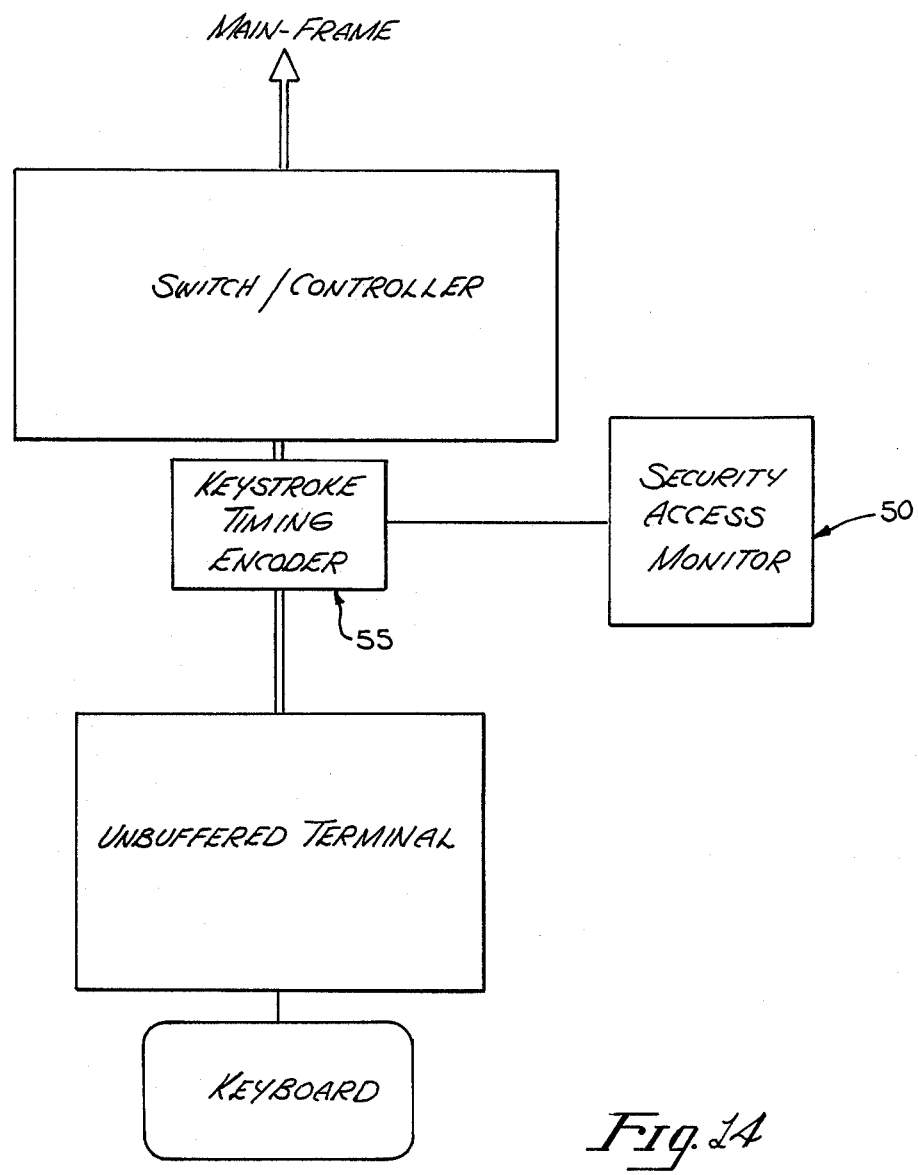
FIG. 14 shows an implementation of the invention in a computer system with unbuffered terminals.

FIGS. 6, 11 and 14 show typical implementations of the invention in computer systems, which implementations may include keyboard means such as a keyboard, a keystroke timing encoder, a keystroke timing interceptor, and a security access monitor (also known as a "verifier"). The security access monitor is typically coupled to the computer so that it may terminate the connection between the computer (e.g. CPU) and the keyboard means (e.g. the keyboard). A keyboard means can be a typical typewriter-like keyboard, or a telephone-like keypad, or the keypads used for automatic teller machines used by banks, or a variety of other instruments having keys for accepting keystrokes. For example, in the stand alone computer, (see FIG. 6) the verifier 24 controls input and output (and hence access) by controlling the bus 30. The use of these different components will depend on the particular implementation of the system; for example, the implementation in a stand alone computer, such as a personal computer, will be somewhat different than the implementation for a mainframe computer system. In either case, the security access monitor (or verifier) is usually a special purpose computer designed to analyze time periods from keystrokes. The system may also include means to encrypt the time periods or the features in order to further prevent unauthorized access. Message-authentication coding is a form of encryption that is well-suited for a multi-terminal use of the invention or a multi-computer use of the invention. The computer sending information will be authenticated only if the information can be de-encrypted; that is, the computer's message is authentic only if it can be de-encrypted. Encryption techniques are described in various references, including, for example *Cryptography and Data Security*, D. E. R. Denning, Addison-Wesley, 1982.

FIG. 6 shows an implementation of the invention on a stand alone computer (such as a personal computer). The computer includes a CPU 20, memory 22, the verifier 24, a disk controller 26, and a video controller 28, all coupled to a bus 30. The keystrokes from the keyboard are timed by the timing encoder 31 and the timing information is typically stored in short term memory for subsequent analysis by the verifier. The verifier 24 compares the template previously generated to the features extracted from the current typing. The verification is transparent to the person using the keyboard and to the application and system software. An implementation in a personal computer may require that certain boot ROMS 32 (read only memory) be changed so that every time the machine is turned on, the system of the invention is invoked. The verifier 24 shown in FIG. 6 includes the keystroke timing encoder. A keystroke timing interceptor may also be included with the verifier in another implementation of the invention on a stand-alone computer where the timing information must be separated from the character data. However, the system's CPU 20 could time the keystrokes, extract the various features and even compare those features to a template. The verifier 24 shown in FIG. 6 extracts the second plurality of features (or plurality of extracted features) from the current typing of the user claiming to be an authorized individual. The extraction process involves the analysis of the second set of time periods which may be based upon at least one group of a predefined number (S) of keystrokes from a second set of keystrokes (i.e. the current typing of the claimant). The verifier 24 also acts as a comparison means and compares the first plurality of features comprising the template to the plurality of extracted features (or the second plurality of features). A comparison by the verifier 24 normally occurs contemporaneously with the feature extraction process which may also occur in the verifier. Thus, the identity of the claimant may be verified contemporaneously with the claimant's typing of a second set of keystrokes. The verifier 24 is usually a special purpose computer which is designed to analyze the time periods collected from a set of keystrokes. In a personal computer, the verifier may be contained on a printed circuit board designed to fit into a peripheral slot of the computer; typically, the board will include boot ROM(s) to replace the computer's boot ROMs so that the computer will not boot without the verifier. As used herein, a ROM is any read only memory device (e.g. EPROM—electrically programmable read only memory). Keyboard service vectors and routines may be used in the stand alone version to allow the verifier to know what key has been struck or the keyboard may be directly connected to the verifier.

It should be noted that a keystroke timer functioning as a timing means need not time every successive keystroke. For example, if the features used in a particular implementation of the invention are such that only the timing of certain characters is necessary in order to derive those features then, the timing means may merely time those particular keystrokes. In particular, if the features used involved the time it takes to type certain words (e.g. "the", "you", etc.) then the timing means could function when such a string of characters has been typed and note the time it took to type such a string.

The verifier 24 (Security Access Monitor) typically operates on a continuous basis determining the plurality of extracted features of each successive group of a predefined number (S) of keystrokes. However, the feature extraction means in the verifier may operate intermittently (e.g. at critical times) or simply in the beginning to verify a single group of keystrokes comprising a second set of keystrokes.

Figure 12:
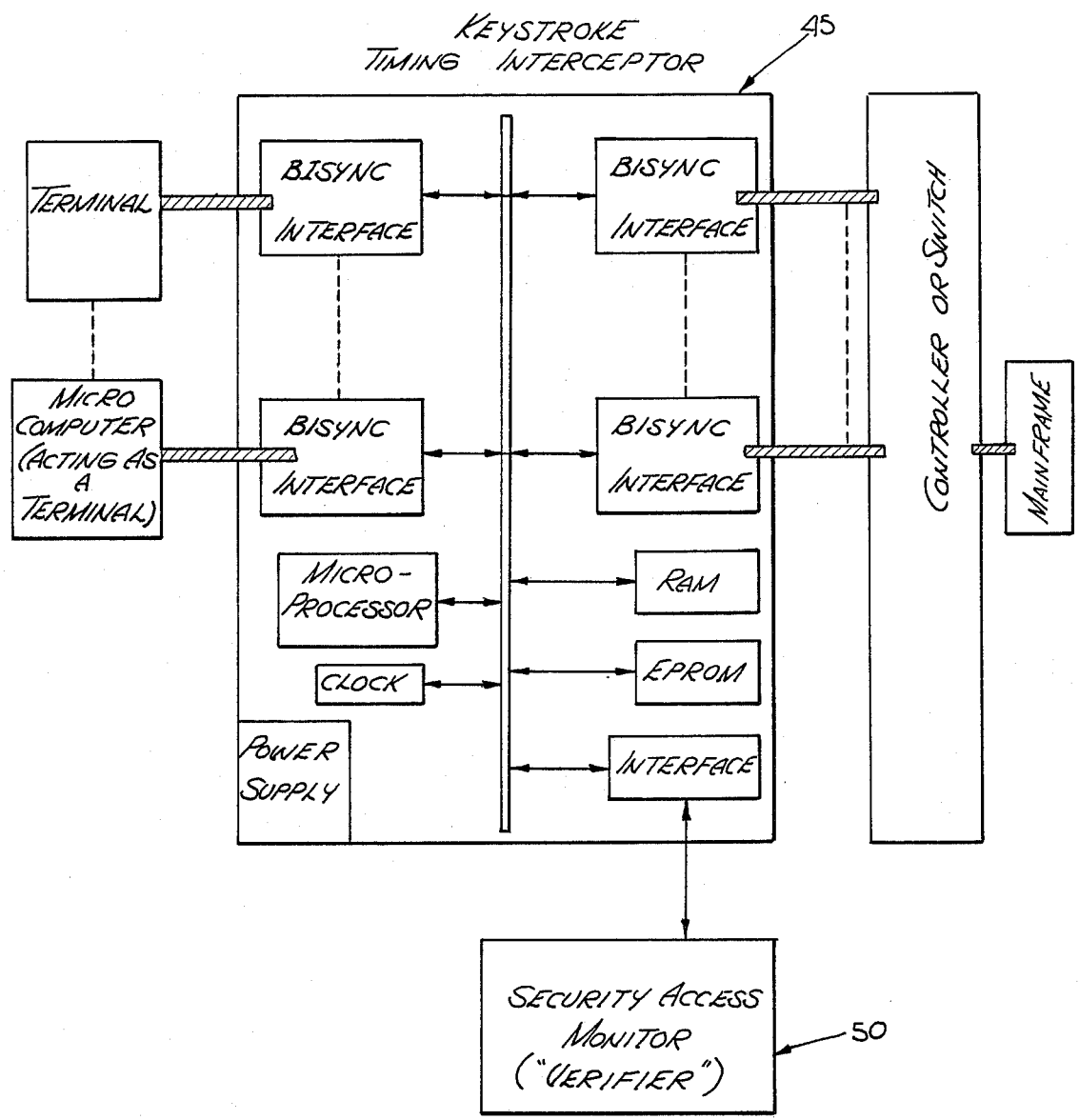
FIG. 12 shows the keystroke timing interceptor which may be used in a computer system having terminals.
Figure 13:
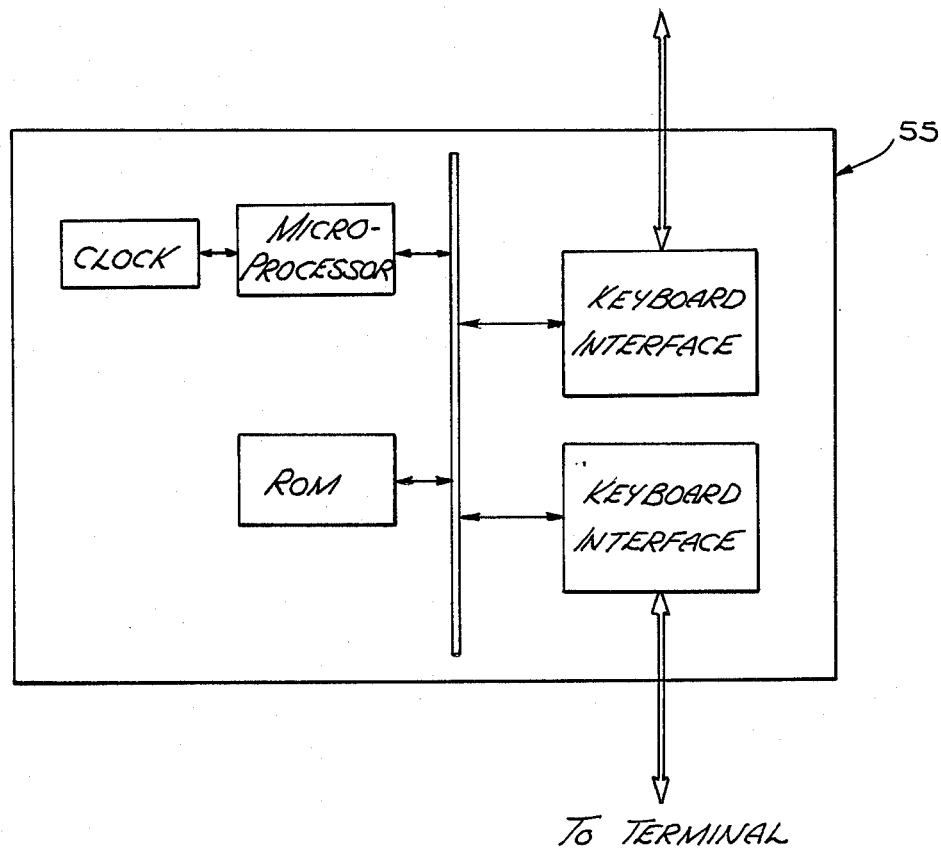
FIG. 13 shows the keystroke timing encoder which may be used in a computer system having terminals.

In an environment with buffered terminals, the keystroke timing means may be located in the terminal itself, typically as a keystroke timing encoder (see FIG. 13). FIG. 13 shows a keystroke timing encoder for use in a buffered terminal environment. Typically, the timing information is shipped along with the terminal information from the terminal to a unit that concentrates the terminal input/output information for the CPU—for instance a terminal cluster controller. As shown in FIGS. 11 and 12, a keystroke timing interceptor 45 is provided in a buffered terminal environment to collect the timing information and pass it to the security access monitor 50 and pass the terminal (e.g. character) information to the input/output concentrator (e.g. controller or switch). The verification is done for the individual terminals (whether buffered or unbuffered) without the direct involvement of the mainframe. "BISYNC", shown in FIG. 12, is a standard type of cabling requiring electronics to drive and interface to it.

For a system with unbuffered terminals, shown in FIG. 14, (i.e. the output of the terminals is not buffered and every character is sent immediately to the input/output concentrator) the keystroke timing encoder that will produce the timing information may be added to the appropriate concentrator device (e.g. cluster controller) and will ship the timing information to the security access monitor 50.

Measurement of keystroke dynamics can include not only the timing dynamics of the actual keystrokes, but the dynamics of the pressure used in making the keystrokes (and the changes in pressure on the keyboard). The pressure dynamics could be measured with loadcells mounted under the keyboard or with load cells attached to the mounting points of the key assembly under every key on the keyboard or with load cells under the mounting assemblies for the printed circuit board that is typically the main part of a keyboard. The signals from the load cells would be digitized (by analog to digital conversion circuitry) and added to the keystroke dynamics information. Information from these load cells would be analyzed by the security access monitor to determine features describing the local and global pressure and changes in pressure on the keys or on the keyboard as they are used. Features such as average pressure, characteristic local pressures, average pressure for specific keys, maximum rates of change in pressure and the like could be determined and added to the features describing the timing dynamics of the keystrokes themselves. The features relating to pressure are handled in the same fashion as features determined from the time periods between keystrokes. The template includes those pressure features and they are compared to the corresponding pressure features from the plurality of extracted features (or the second plurality of features).

The security access monitor (verifier) in its simplest implementation compares features from a first set of keystrokes to features extracted from a second set of keystrokes. The security access monitor typically includes a comparison means for comparing the first plurality of features comprising the template to the second plurality of features (or plurality of extracted features). The security access monitor also includes in a typical implementation of the invention, a feature extraction means for determining the plurality of extracted features (or second plurality of features) based upon the second set of keystrokes. That feature extraction means may also generate the template (by extracting the features based upon the first set of time periods between keystrokes from a first set of keystrokes) and thereby act as a template generation means. The second set of keystrokes is typically the current typing of the claimant.

Figure 8:
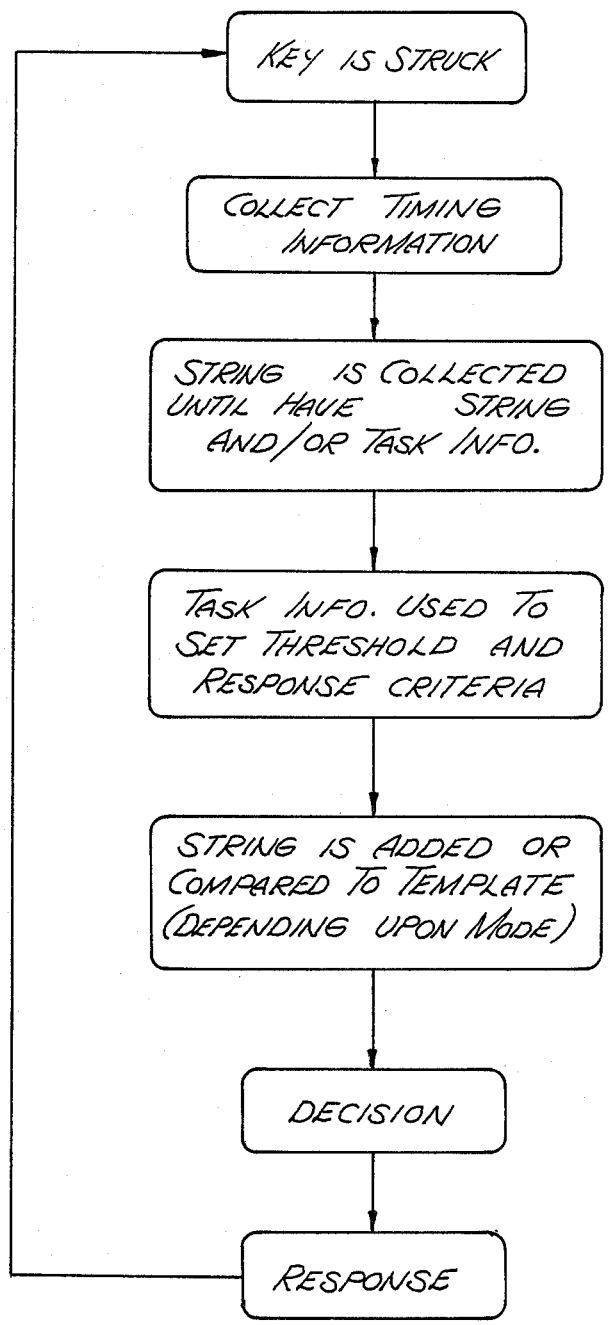
FIG. 8 is an overview, by a flow chart, of the verification or template generation processes of the invention.
Figure 10:
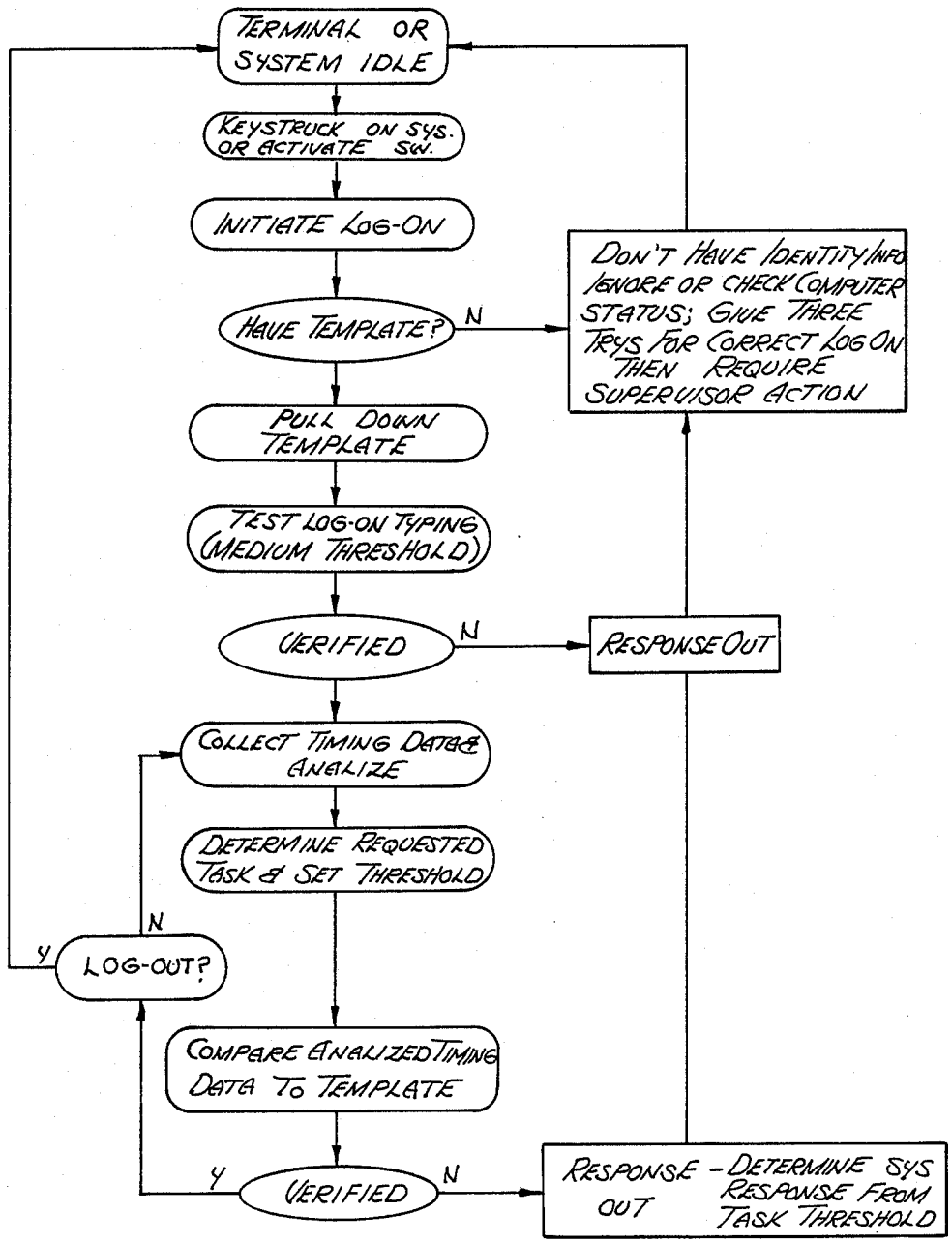
FIG. 10, in flow chart form, illustrates the invention in the verify mode.

FIGS. 8 and 10 illustrate the general sequence of keystroke dynamic verification. As keys are struck, the timing information associated with the time between keystrokes is collected. The timer, typically found in the keystroke timing encoder, functions as the timing means which collects the timing information. Typically, the timing information is stored in a storage means such as RAM (random access memory). If some of the features used in the system are based on a predefined number (S) of keystrokes, the feature extraction means waits until that string of S keystrokes is collected. Additionally, if the tasks requested by the claimant are associated with various security levels, that information is also collected usually by the feature extraction means. Task information is used to set the predefined threshold value defining either the lowest permissible similarity between the template and the plurality of extracted features (or second plurality of features) or the greatest permissible difference between the template and the plurality of extracted features. Once a sufficient number of keystrokes has been collected (e.g. S keystrokes) and the task information has been determined, the feature extraction means, which is coupled to the timing means, determines the plurality of extracted features based upon the second set of time periods derived from the second set of keystrokes. The feature extraction means usually comprises logic units, incorporated as part of the security access monitor, which execute the various mathematical calculations to determine the features from the timing information. Once the features are determined for the second plurality of features or plurality of extracted features, they may be compared to the template (comprising a first plurality of features). Typically, the first plurality of features (comprising the template) has the same group of n features as the plurality of extracted features (or second plurality of features). That is, there is a one to one correspondence between the two pluralities of features. The comparison determines the correlation between the template and the plurality of extracted features (or second plurality of features), which correlation is a measure of the relationship between the two typing samples (representing the first set of keystrokes and the second set of keystrokes). The correlation could be a measure of either the similarity between the template and the plurality of extracted features or the difference between the template and the plurality of extracted features. The comparison means normally compares each feature of the first plurality of features to each corresponding feature of the plurality of extracted features (or second plurality of features). That comparison (of each feature of the first plurality to each corresponding feature of the second plurality) may be used directly to evaluate the correlation or more sophisticated techniques may be used as described below. The comparison means usually comprises logic units, incorporated as part of the security access monitor, which execute the mathematical calculations used to determine the correlation.

The correlation may be determined by using vector analysis. A first plurality of features which is constructed to have the same group of n features as a plurality of extracted features (or second plurality of features), represents a vector of n features that is a point in n-dimensional space. Similarly, the plurality of extracted features, having n features, represents a vector with n features which is another point in the same n-dimensional space. These two vectors may be compared by measuring the Euclidean distance between the points in n-dimensional space. Naturally, the smaller the distance between the points, the more likely that the two samples were typed by the same individual (e.g. the claimant is probably the creator). The Euclidean Distance (D) is given by the generalized expression:

$$D = \sqrt{\sum_{i=i}^{n} (X(i) - Y(i))^2},$$

where X and Y are n dimensional vectors representing the first plurality of features and the plurality of extracted features (or second plurality of features) and where $X(i) = x_i$ and $X = (x_1, x_2, x_3, \ldots x_n)$ and $Y(i) = y_i$ and $Y = (y_1, y_2, y_3, \ldots y_n)$. This analysis will produce a single number which can be compared to predefined threshold values. Those predefined threshold values would define the greatest permissible differences between the template of features and the plurality of extracted features (or second plurality of features) beyond which specified actions will be taken. Predefined threshold values may be empirically derived by producing graphs as shown in FIGS. 2, 4 and 5 and varying the threshold value to maximize system efficiency as described below. Thus, the correlation, based on the Euclidean Distance could be used to measure the difference between the template and the plurality of extracted features (or second plurality of features).

Other methods of determining the difference or similarity between the template and the plurality of extracted features (or second plurality of features) may be used, such as a Euclidean Distance which takes into account the variability of an individual's typing. In particular, some compensation can be made for individuals whose individual features have variances that are different from the main population. For these individuals, system performance can often be improved when their feature weighting is different from that of others within the same population; therefore, the feature set can be weighted differently for each individual. This can be computationally intensive for template generation, but can improve system performance.

Individual variance can also be normalized by factoring it into the calculation of Euclidean Distance, where the distance D would be:

$$D = \sqrt{\sum_{i=i} W(i) \frac{(X(i) - Y(i))^2}{(S_1(i) - S_2(i))^2}}$$

where $W(i)$ are the weights for the features, and $S_1(i)$ and $S_2(i)$ are standard deviations for the features in the template and current set of keystrokes (second set of keystrokes). With this method, the variability specific to both the feature and the individual user is taken into account for the distance measurement. The inventors presently use this Euclidean Distance, with individual standard deviations, and weight all features equally (e.g. $W(i) = 1$ for all values of i). Again this distance measurement may be used as the correlation which may be compared to predefined threshold values.

The response of the system when the comparison indicates that the claimant is not the creator (i.e. someone is attempting an unauthorized use) may be made dependent on various factors, including the tasks or files requested, the degree of security necessary, the specific individual being verified, and the probability of Type 1 Errors (false rejections). The system's response may also be made dependent on the severity of the mismatch between the claimant's and creator's typing patterns. For example, the system's response could include any one of the following:

(1) the system starts an audit trail, stating information about the claimants actions;

(2) re-enter data last entered in order for the system to reexamine the typing patterns;

(3) the system requests audit information, asking the claimant various questions designed to determine whether the claimant is the creator—i.e. the authorized user;

(4) system supervisor is alerted;

(5) present job suspended and re-log-on necessary to make system functional again;

(6) the system is left hanging such that the user cannot reboot the system to make it operate—a supervisor is required to restart the system. Such different responses can be associated with different tasks requiring different levels of security. For example, a million dollar electronic funds transfer may have a higher security than a mere status check on a credit account, and hence a failure to verify the claimant at a certain threshold level as the creator would result in a more severe response in the case of the fund transfer than the status check.

The system of the invention may also modify the template to account for an individual's change in his typing patterns over time. The template modification process can (and should) only occur after the claimant is verified to be the creator. The template modification typically occurs by modifying each feature in the template (i.e. the first plurality of features) so that each feature of the first plurality of features more closely approximates such corresponding feature of the plurality of extracted features (or second plurality of features). Typically, the modification of each feature would occur only when the difference between each feature of the first plurality of features and each corresponding feature of the plurality of extracted features (or second plurality of features) is within a predefined modification range for each feature. For example, if the feature based on the time it takes to type the word "the" in the first plurality of features has the value of 400 milliseconds and the corresponding feature in the plurality of extracted features has a value of 375 milliseconds, then, if the predefined modification range for that feature is greater than 25 milliseconds, then the feature from the first plurality of features representing that feature is modified to approximate the corresponding feature from the plurality of extracted features. The modification can occur in many different ways. For example, taking a weighted average of the features is one possible solution. Others include: setting the feature from the first plurality of features equal to the corresponding feature from the plurality of extracted features, etc. The predefined modification range may be expressed as the difference between the features from the first plurality of features and the plurality of extracted features. Care must be taken to prevent an unauthorized individual from modifying the authorized template. For systems requiring high security, no template modification should be permitted.

Performance of the invented system may be measured and thus improved if the costs of false acceptance and false rejection errors can be calculated or approximated. In general, false rejection errors slow the authorized user's operation and have other effects that can be weighed in quantitative, usually monitary terms. False acceptance errors result in risks and probable losses that can also be reduced to measurable quantities—perhaps money spent for the replacement of lost assets. These costs, expressed in common units, such as dollars, are denoted as $C_1$ and $C_2$ for the costs of false rejection and false acceptance errors respectively. The a priori probability that persons approaching an access point are impostors is another important consideration in the operation of an access control system. Let this probability by $P(I)$; the probability that persons approaching this access point are authorized to enter is, then, $1 - P(I)$.

The expected loss (or cost) of wrongfully denying access to authorized persons is $$L_1 = C_1[1 - P(I)][\text{probability of Type I error}]$$

and the expected loss of wrongfully granting access to imposters is $$L_2 = C_2[P(I)][\text{probability of Type II error}].$$

It can be shown that the minimum total loss (or system cost) occurs when $L_1$ is equal to $L_2$. This implies that the system operator must set the predefined threshold value such that the probability of Type 1 error and the probability of Type 2 error satisfy the following relation if minimum-cost performance is desired:

$$\frac{[\text{probability of Type II error}] \; C_2[P(I)]}{[\text{probability of Type I error}] \; C_1[1 - P(I)]} = 1$$

This equation may be used as in the following example: if the cost of a false rejection error ($C_1$) is 1 unit, the cost of a false acceptance error ($C_2$) is 170 units, and the probability that an imposter will attempt access, $P(I)$, is 0.001, the ratio of the probability of Type I error to the probability of Type II error should be about 1/6 for minimum-cost performance. Thus, the threshold value of the system must be set to achieve this ratio. The vertical dashed line in FIG. 5 shows this graphically as the selection of a specific threshold "$X_o$", can be found to achieve the required ratio of about 1/6.

In addition to verifying that access to a computer system or other device is authorized, the invention can be used to discover areas where productivity may be improved and can be used generally in productivity management. The invention provides methods for monitoring and timing the time it takes a user of, for example, a computer to perform tasks on the computer. Those methods can produce data illustrating the various times it took certain tasks to be performed. That data will indicate that improvements may be warranted in performing certain tasks. For example, a person performing word processing (e.g. typing text) and using a spreadsheet (e.g. entering data) may perform the word processing task much more quickly than comparable spreadsheet tasks. This suggests that the spreadsheet process could be improved; for example, better knowledge of the spreadsheet's commands may be needed. The invention can then be used to determine if the improved knowledge of those commands has improved the performance of the spreadsheet tasks. In summary, the invention provides a system and method for verifying an individual's typing dynamics. The invention is based on the differences in the keystroke dynamics between individuals' typing and compares the time periods, which have been mathematically formulated into features, between two typing samples.

While a particular form of the invention has been illustrated in the figures and described, it will be apparent that other modifications can be made without departing from the spirit and scope of the invention.

We claim:

1. In a digital computer system having a keyboard to accept keystrokes for inputting data in the form of alphanumeric characters, a method for verifying that a user of said system, said user claiming to be a particular individual, is said individual, said method comprising the steps of:
    generating a template for said individual, said template comprising a first plurality of features based upon a first set of time periods between keystrokes from a first set of keystrokes of said individual and based upon measurements representative of the pressure of said first set of keystrokes, said first set of keystrokes comprising a predetermined set of keystrokes;
    storing said template in a storage means;
    timing periods between said user's currently inputted keystrokes, said periods between said user's currently inputted keystrokes comprising a second set of time periods, wherein the sequence of keystrokes in said user's currently inputted keystrokes is not the same as the sequence of keystrokes in said first set of keystrokes and wherein said user's currently inputted keystrokes originate from said user;

measuring a representation of the pressure applied to the keys of said keyboard during said user's currently inputted keystrokes;

storing said periods between said user' currently inputted keystrokes in said storage means, wherein said user's currently inputted keystrokes comprise a string of said characters;

determining a plurality of extracted features based upon said second set of time periods and based upon said pressure measured during said user's currently inputted keystrokes, said first plurality of features having the same group of n features as said plurality of extracted features;

comparing said template to said plurality of extracted features, each feature of said first plurality of features being compared to each corresponding feature of said plurality of extracted features, the identity of said individual being verified by the correlation between said template and said plurality of extracted features, whereby the identity of said user claiming to be said individual may be verified.

2. A device for verifying the identity of an individual based on keystroke dynamics, said device being coupled to a computer system having a central processing unit (CPU) to control access to said computer system, said device comprising:

keyboard means having a plurality of input keys for the inputting of data by keystrokes;

timing means coupled to said keyboard means for timing periods between said keystrokes;

pressure sensing means coupled to said keyboard means for measuring the pressure of said keystrokes;

template generation means coupled to storage means, said template generation means for generating a template for each individual using said computer system, said template comprising a first plurality of features based upon a first set of time periods between keystrokes from a first set of keystrokes of said individual and based upon the pressure of said first set of keystrokes, said template being stored in said storage means and being generated upon inputting of a predefined code;

feature extraction means coupled to said timing means, said feature extraction means for determining a plurality of extracted features based upon a second set of time periods from a second set of keystrokes and based upon the pressure of said second set of keystrokes, said timing means being coupled to said storage means for storing said second set of time periods, wherein the sequence of keystrokes in said second set of keystrokes is not the same as the sequence of keystrokes in said first set of keystrokes and said second set of keystrokes originates from said individual;

comparison means coupled to said feature extraction means and to at least one of said template generation means and said storage means, said comparison means comparing said template to said plurality of extracted features, said first plurality of features having the same group of n features as said plurality of extracted features, each feature of said first plurality of features and each corresponding feature of said plurality of extracted features being multiplied by a predefined factor, thereby modifying each feature, said comparison means comparing said features as modified, the identity of said individual being verified by the correlation between said template and said plurality of extracted features, said correlation being based on said features as modified, said comparison means operating contemporaneously with said feature extraction means and said timing means such that said plurality of extracted features is compared to said template contemporaneously with the typing of said second set of keystrokes, whereby the identity of said individual may be verified contemporaneously with the typing of said second set of keystrokes.

3. A device according to claim 2, wherein said first plurality of features is based upon at least two (2) groups of a predefined number (S) of keystrokes from said first set of keystrokes, each feature of said first plurality of features being an average of the corresponding features derived from each group of said predefined number (S) of keystrokes from said first set of keystrokes, and wherein said feature extraction means continuously determines the current plurality of extracted features for each successive group of said predefined number (S) of keystrokes from said second set of keystrokes and said comparison means continuously compares said current plurality of extracted features to said first plurality of features.

* * * * *